(12) United States Patent
Konno

(10) Patent No.: US 6,606,460 B2
(45) Date of Patent: Aug. 12, 2003

(54) APPARATUS HAVING A HELP FUNCTION, IMAGE-FORMING APPARATUS, AND METHOD AND PROGRAM FOR DISPLAYING HELP INFORMATION

(75) Inventor: Michiaki Konno, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 10/024,529

(22) Filed: Dec. 21, 2001

(65) Prior Publication Data

US 2003/0118354 A1 Jun. 26, 2003

(51) Int. Cl.[7] .......................... H04N 1/00; G03G 15/00; G03G 21/00
(52) U.S. Cl. ................ 399/9; 358/1.15; 399/8
(58) Field of Search ................. 399/8, 9, 11, 81, 399/82, 83, 85; 358/1.15, 1.16; 708/173

(56) References Cited

U.S. PATENT DOCUMENTS

| | | | | |
|---|---|---|---|---|
| 5,539,499 A | * | 7/1996 | Fujisawa | 399/9 |
| 5,802,429 A | * | 9/1998 | Yamashita | 399/8 |
| 6,369,833 B1 | * | 4/2002 | van Liempd et al. | 358/1.15 X |
| 2002/0005964 A1 | * | 1/2002 | Matsumoto et al. | 358/400 |

FOREIGN PATENT DOCUMENTS

| | | | |
|---|---|---|---|
| JP | 9-130509 | | 5/1997 |
| JP | 11-191822 | * | 7/1999 |

* cited by examiner

Primary Examiner—Sophia S. Chen
(74) Attorney, Agent, or Firm—Foley & Lardner

(57) ABSTRACT

An image forming apparatus, method and program having a help function allow a user to obtain help information after first checking what help information is available at a host computer. In the image-forming apparatus 100, a first CPU 16 which serves as the controller in a printer/scanner section 10 accesses, via an external interface 20, an information source connected to a network NW, and has a list of help information displayed. In response to a help request selected and input from a control panel 15, necessary portions of detailed operating instructions or troubleshooting instructions are successively downloaded from the information source through the external interface and displayed on a control panel. The apparatus makes it possible to check what help information is available at a host computer and to obtain desired help information. Information capable of providing detailed instructions can be furnished without requiring the apparatus to have a large memory.

22 Claims, 5 Drawing Sheets

APPARATUS HAVING A HELP FUNCTION, IMAGE-FORMING APPARATUS, AND METHOD AND PROGRAM FOR DISPLAYING HELP INFORMATION

BACKGROUND OF THE INVENTION

1. Field of the Invention

The present invention relates to an apparatus having a help function, an image-forming apparatus, and a method and program for displaying help information. More particularly, the invention relates to an apparatus having a help function which is capable of displaying help information such as operating instructions and troubleshooting instructions on a display via a communications line, and to an image-forming apparatus and a method and program for displaying such help information.

2. Description of the Related Art

Copiers and other devices having a help function that are already known to the art include the image-forming apparatus described in JP-A 9-130509. The image-forming apparatus disclosed in that prior-art publication is designed so that when a user requests a specific help item, the apparatus connects to a host computer via the Internet, retrieves the help item from the host computer and downloads the help information so that it can then be viewed on a display such as the control panel on the image-forming apparatus. Such an image-forming apparatus makes it possible to refer to detailed help information by means of a so-called help function without using a large memory.

Such prior-art image-forming apparatuses can acquire only help information on predetermined topics, that information being obtained over the Internet from a host computer However, there are cases in which, were it possible for the user to download desired help information after first checking the types of help information available at the host computer, help information could be furnished in a form better suited to the user's needs. In prior-art image-forming apparatuses such as that described above, only help information relating to specific pre-selected items is retrieved from the host computer and displayed on the image-forming apparatus. Hence, it is not possible for the user to obtain help information after first checking what types of help information are available at the host computer Moreover, such an arrangement is poorly suited for adapting to changes at the host computer, such as the addition of new help information items.

SUMMARY OF THE INVENTION

The present invention was achieved in light of the above problems. The object of the invention is to provide an apparatus having a help function, an image-forming apparatus, and a method and program for displaying help information which enable help information to be obtained on the user side after first checking what types of help information are available on the host computer To resolve the above-described problems, in a first aspect, the invention provides an apparatus having a help function, which apparatus includes communication means for connecting via a communications line to an information source containing help information that includes at least operating instructions or troubleshooting instructions; first help information selecting means for selecting desired help information from the information source connected through the communication means; and first help information displaying means for acquiring from the information source and displaying help information selected by the first help information selecting means.

In the foregoing apparatus of the invention, the first help information selecting means preferably has a means for displaying a first information list of help information items available at the information source and for selecting desired items of help information from the list The above apparatus of the invention preferably includes also memory means for storing help information; means for deciding whether the apparatus is connected via a communications line to the information source and is ready to receive help information from the information source; and second help information displaying means for displaying help information stored in the memory means if the decision means determines that the apparatus is not in a ready-to-receive state.

In the above apparatus of the invention, if the decision means determines that the apparatus is not in a ready-to-receive state, the communication means preferably initiates connection to the information source and attempts to set the apparatus in a ready-to-receive state.

In the above inventive apparatus, if the decision means determines that the apparatus has not attained a ready-to-receive state after the communication means repeatedly attempts a given number of times to connect to the information source, the second help information displaying means preferably displays help information from it the help information memory means.

The above inventive apparatus preferably has second help information selecting means for displaying a second information list of help information items stored in the help information memory means and for allowing desired help information to be selected from the list and displayed on the second help information displaying means.

In the above apparatus of the invention, the first information list preferably includes at least dictionary help information, operating help information, or troubleshooting information.

The above inventive apparatus preferably has section indicating means that allows an input to be made indicating the section of the apparatus for which specific help information is desired.

In the above inventive apparatus, the section indicating means preferably displays a structural diagram of the apparatus which is divided into a plurality of zones and allows the section in question to be selected.

The apparatus of the invention is typically an image-forming apparatus.

In a second aspect, the invention provides an apparatus having a help function, which apparatus includes means for detecting a given status of the apparatus; means for connecting the apparatus, based on results of detection by the status detection means, to a specific information source via a communications line; and help information displaying means for acquiring information on the given status from the specific information source and displaying it as help information.

The apparatus according to the second aspect of the invention which additionally includes connection request indicating means for indicating, based on the results of detection by the status detection means, a request to initiate connection by the connecting means.

The apparatus according to the second aspect of the invention wherein, based on the results of detection by the status detection means, the help information displaying means retrieves help information on the given status from the specific information source and displays the retrieved help information.

The apparatus according to the second aspect of the invention which additionally includes means for notifying a service center of a given status of the apparatus, based on the results of detection by the status detection means.

In a third aspect, the invention relates to a method for displaying help information in an apparatus having a help function, which method includes the steps of connecting the apparatus via a communications line to an information source containing help information that includes at least operating instructions or troubleshooting instructions, selecting desired help information from the information source connected via the communications line; and acquiring from the information source and displaying on a display help information selected in the help information selecting step.

In a fourth aspect, the invention relates to a method for displaying help information in an apparatus having a help function, which method includes the steps of detecting a given status of the apparatus; based on the results of the given status detecting step, connecting the apparatus to a specific information source via a communications line; and acquiring information on the given status from the specific information source and displaying it as help information.

In a fifth aspect, the invention relates to a method for displaying help information in an apparatus having a help function, which method includes the steps of, based on a help request, attempting to access and connect to an information source containing as help information at least operating instructions or troubleshooting instructions; determining whether access is successful, if access is successful, displaying a list of help information on a display and allowing desired help information to be selected; acquiring from the information source help information relating to a selected item; and, if access to the information source is unsuccessful, displaying on the display secondary help information which is already stored in a memory provided in the apparatus.

In a sixth aspect, the invention relates to a program for displaying help information in an apparatus having a help function, which program executes on a computer the steps of connecting the apparatus via a communications line to an information source containing help information that includes at least operating instructions or troubleshooting instructions; selecting desired help information from the information source connected via the communication means; and acquiring help information selected in the help information selecting step from the information source and displaying it on a display.

In a seventh aspect, the invention relates to a program for displaying help information in an apparatus having a help function, which program executes on a computer the steps of detecting a given status of the apparatus; based on the results of the given status detecting step, connecting the apparatus to a specific information source via a communications line; and acquiring information on the given status from the specific information source and displaying it as help information.

In an eighth aspect, the invention relates to an image-forming apparatus in which available explanatory material on operating instructions or troubleshooting instructions is pre-stored in a memory and which, when a help request asking for operating instructions or troubleshooting instructions is received, can respond to a user request by displaying the explanatory material on a control panel The apparatus has an external interface which can be, connected through a network to an information source containing operating instructions and troubleshooting instructions more detailed than the explanatory material stored in the memory so as to enable access to the information source. The apparatus also has a controller which, when a help request is received from a user, attempts to access the information source through the external interface and, if access is successful, displays a list of available services in response to the help request, then downloads from the information source and displays on the control panel explanatory material on whichever service is selected from among those displayed. If access to the information source is not successful, the controller displays on the control panel the explanatory material already stored in the memory.

The apparatus according to the eighth aspect of the invention in which, when a malfunction requiring the attention of a service technician occurs during operation of the apparatus, the controller displays on the control panel a message prompting the user to issue a help request for a service call, and initiates access to the information source in response to the help request issued as a result of the displayed message.

The apparatus according to the eighth aspect of the invention in which, upon receiving a help request, the controller displays on the control panel a structural diagram of the apparatus divided into a plurality of zones for clear indication of the section of the apparatus to which the help request pertains, and allows that section to be selected.

The foregoing arrangement allows the user to obtain help information after first checking what type of help information is available at the host computer. Moreover, information can be provided on the latest detailed operating instructions and troubleshooting instructions without requiring the apparatus to have a large memory.

When the apparatus has a service call function, the user is automatically notified of a malfunction requiring the attention of a service technician, and can also be provided with pertinent information. Moreover, when making a request for help information, the information is easy to specify because it can be done visually on a structural diagram.

DESCRIPTION OF THE PREFERRED EMBODIMENTS

Preferred embodiments of the invention are described below in conjunctions with the accompanying diagrams.

Figure 1:
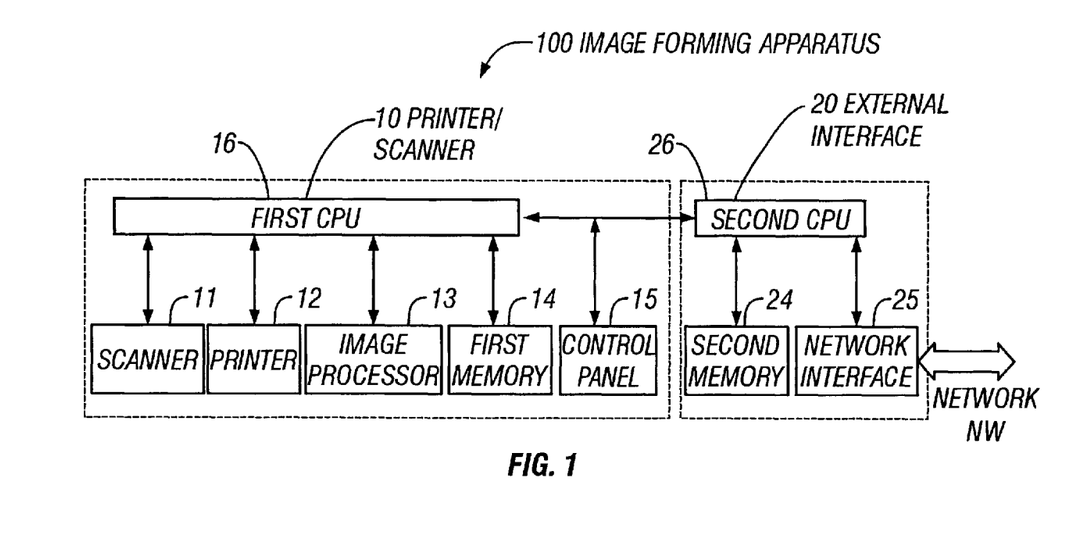
FIG. 1 is a block diagram illustrating one embodiment of the image-forming apparatus of the invention.
Figure 2:
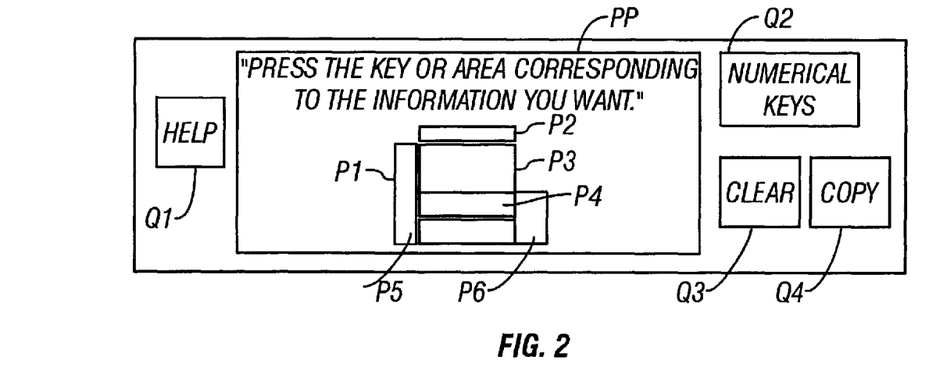
FIG. 2 illustrates keys displayed on a control panel of the image-forming apparatus in FIG. 1, which keys divide the apparatus into a number of sections and are used for specifying a particular section.
Figure 3:
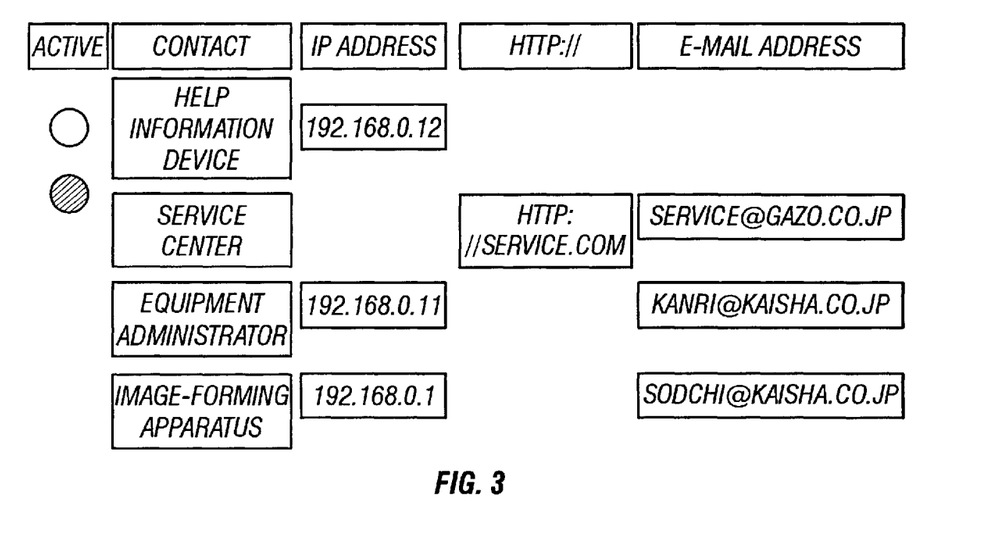
FIG. 3 shows initialization content for automated connection with related contacts.
Figure 4:
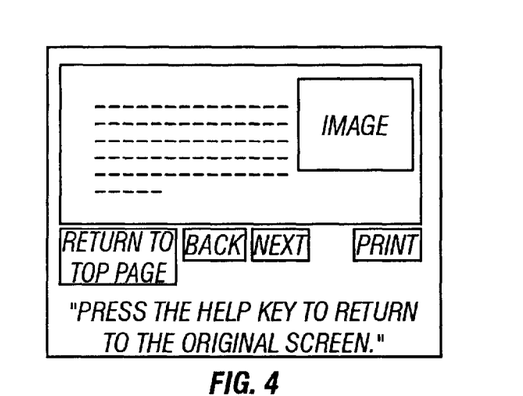
FIG. 4 shows an explanatory screen displayed for the area selected on the control panel of the image-forming apparatus in FIG. 1.
Figure 5A:
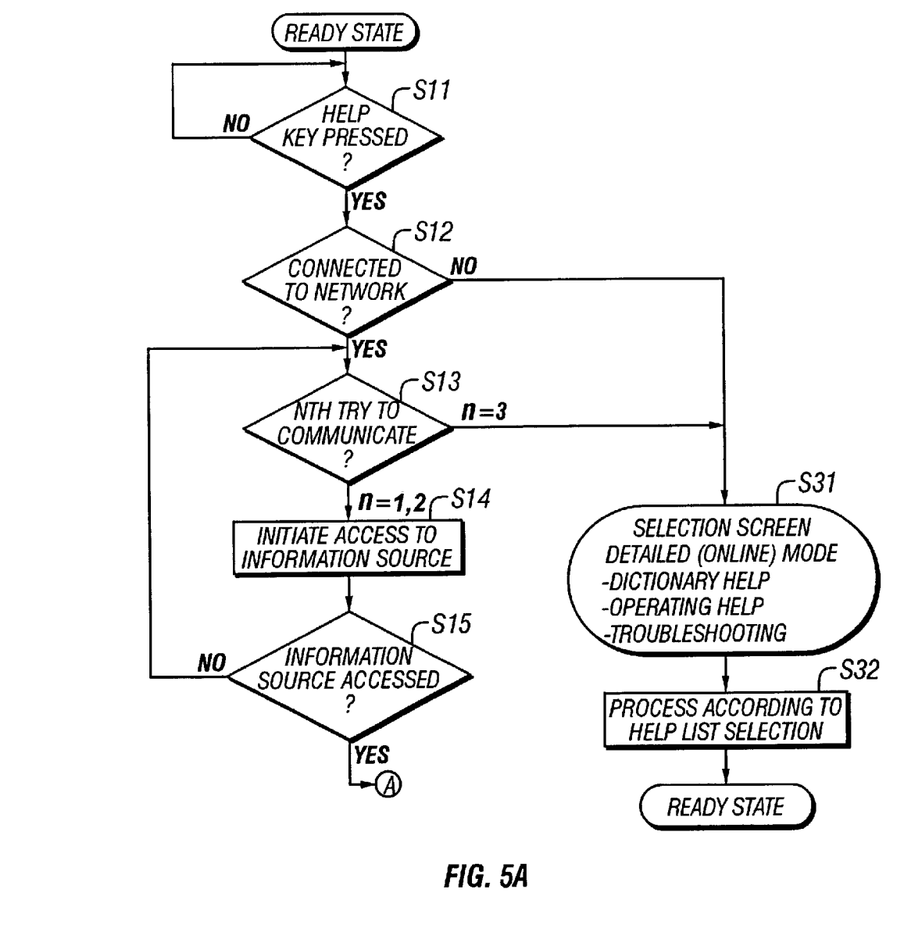
FIGS. 5A and 5B are flow diagrams illustrating control operations executed by the first and second CPU when a help request is issued in the image-forming apparatus shown in FIG. 1.
Figure 5B:
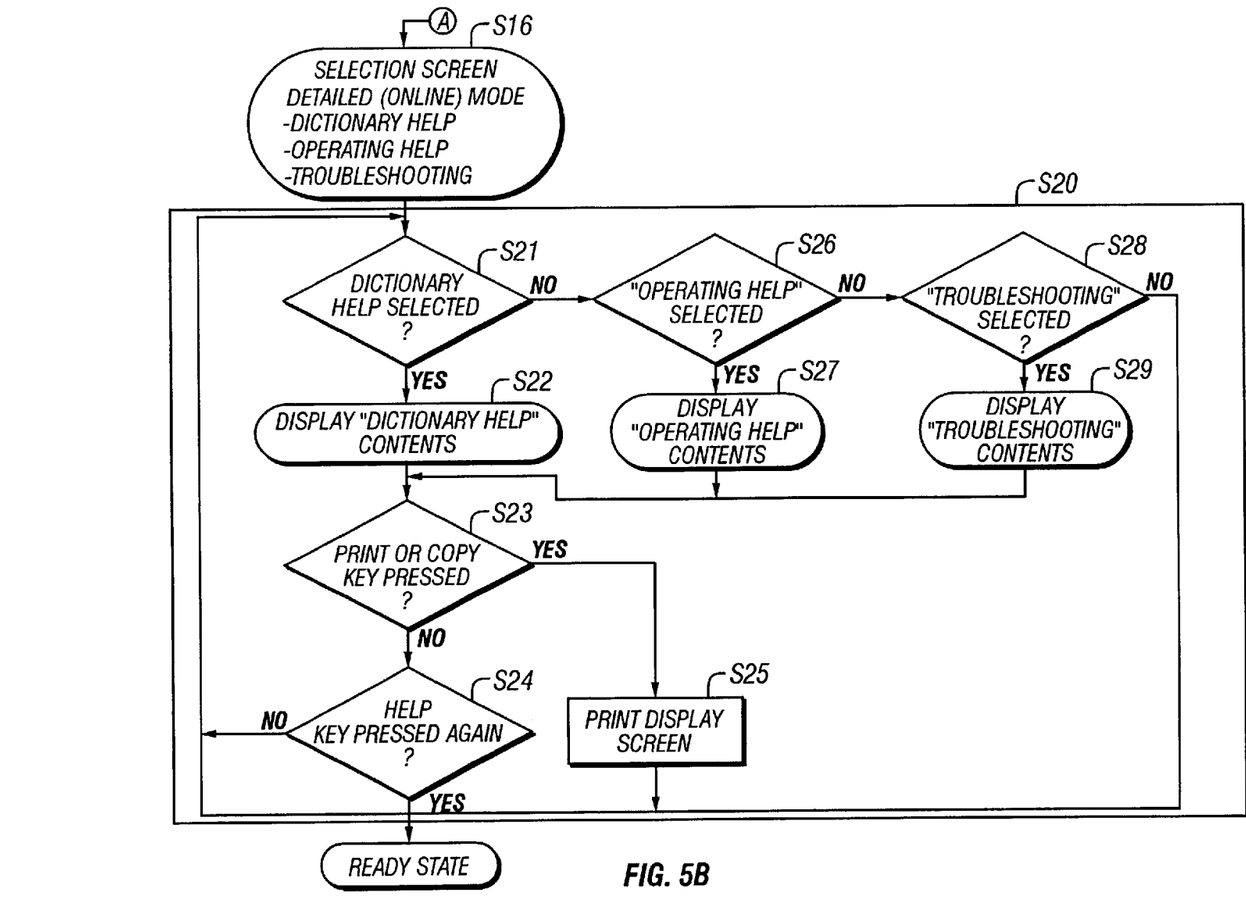
Figure 6:
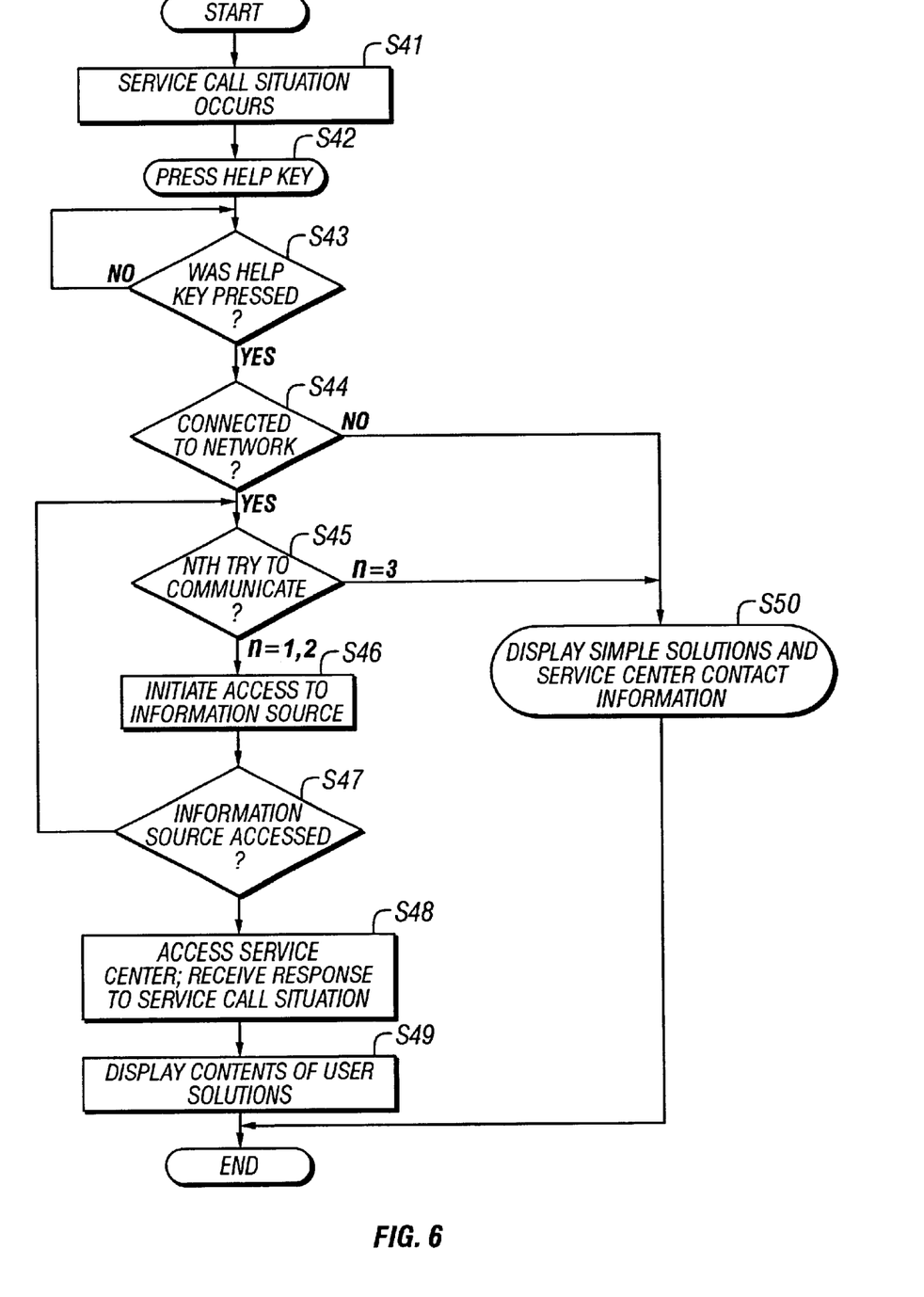
FIG. 6 is a flow diagram illustrating control operations executed by the first and second CPU when a service call situation arises.

FIG. 1 is a block diagram illustrating one embodiment of the image-forming apparatus of the invention. FIG. 2 illustrates keys displayed on a control panel of the image-forming apparatus in FIG. 1, which keys divide the apparatus into a number of sections and are used for specifying a particular section. FIG. 3 illustrates initialization content for automated connection with related contracts. FIG. 4 shows an explanatory screen displayed for the area selected on the control panel of the image-forming apparatus in FIG. 1. FIGS. 5A and 5B are flow diagrams illustrating control operations executed by the first and second CPU when a help request is issued in the image-forming apparatus shown in FIG. 1. FIG. 6 is a flow diagram illustrating control operations executed by the first and second CPU when a service call situation arises.

The image-forming apparatus 100 shown in FIG. 1 is a multifunction apparatus which includes a printer/scanner 10 and an external interface 20, and which has been network (NW) enabled. The printer/scanner 10 has a scanner 11 for scanning a document; a printer 12 which carries out printing based on the scanned document; an image processor 13 which performs various image processing on the scanned document; a first memory 14 which stores control programs and settings for first and second CPUs 16, 26, stores various processing contents (e.g., simple solutions to help requests), and provides temporary storage associated with these operations; a control panel 15 for carrying out various displays and receiving external input; and a first CPU 16 which controls these components and the external interface 20.

The external interface 20 has a second memory 24 which stores control programs and settings for external access through a network NW and provides temporary storage associated with processing; a network interface 25 for exterior access through the network NW; and a second CPU 26 which, based on input from the first CPU 16 and the control panel 15, executes network (NW)-elated control operations while referring to the second memory 24 and the network interface 25 and operate access to an outside device in cooperation with the first CPU 16. In this image-forming apparatus 100, it is assumed that initialization for automated connection with related contacts is carried out as shown in FIG. 3. That is, information such the Internet provider addresses, Web page URLs, and e-mail addresses of related contacts has already been set As shown in FIG. 2, a plurality of keys for dividing the image-forming apparatus 100 into several sections and specifying particular sections are arranged as a touch panel on the control panel 15 of the above-described image-forming apparatus 100. At the center of the display, the structure of the image-forming apparatus 100 is schematically divided into a number of sections so as to allow individual sections to be specified. A general selection key PP shows the overall structure of the image-forming apparatus 100, and has situated at the interior thereof section selection keys P1, P2, . . . P6 which divide the image-forming apparatus 100 into several structural areas and specify particular areas. Situated at the periphery thereof are other keys, including a Help key Q1, a set of numerical keys Q2, a Clear key Q3, and a Copy key Q4.

Next, the control operations by the above-mentioned first and second CPUs 16, 26 in the image-forming apparatus 100 are described while referring to FIGS. 5A and 5B. The first CPU 16 decides whether Help key Q1 on the control panel 16 has been pressed (S11). If it has not been pressed, the same decision operation is repeated. If it is determined that the Help key Q1 has been pressed, the second CPU 26 is instructed to check the connection with the network NW.

The second CPU 26 decides whether the image-forming apparatus 100 is already connected to the network NW through the network interface 25 (S12). If the image-forming apparatus 100 is determined to be connected to the network NW, the second CPU 26 decides whether this is the first or second attempt or whether it is the third attempt at the same communication (S13). If it is determined in step S13 that this is the first or second attempt at communication, access to an information source (a device or service center on the network which is capable of furnishing information in response to the help request) through the network NW is initiated (S14).

Next, the second CPU 26 decides whether access to the information source initiated in step S14 has succeeded (S15). If access is unsuccessful, the program returns to step S13. If access is successful, the first CPU 16 displays on the control panel 15, and separately from the screen shown in FIG. 2, a help list which is a selection screen (S16). In this embodiment, "Dictionary Help," "Operating Help," and "Troubleshooting" are displayed as the help list. Processing is then carried out to detect which of the displayed help list items has been selected (S20). This begins with step S21, in which the first CPU 16 determines whether Dictionary Help was selected in Step S20.

If it is determined that Dictionary Help was selected in Step 21, the message "Press the key or area corresponding to the information you want is displayed (a flashing display is preferred) in the general selection key PP region shown in FIG. 2. When a particular area (key) is pressed in response to the displayed message, an image and explanatory text on the area that was pressed are displayed, as shown in FIG. 4 (S22). The material displayed in this case is the latest detailed information downloaded from the information source, not the simple solutions stored in the first memory. Other items displayed on this screen include a Return to Top Page key for returning to the top page, a Back key for returning to the preceding explanation, a Next key for proceeding to the next explanation, and a Print key for printing the current image and explanation. The first CPU has been set so that, when these keys are pressed, it carries out processing in accordance with the pressed key. These key display settings are the same also when Operating Help or Troubleshooting is selected.

After carrying out display in step S22, the first CPU 16 decides whether the Print key or the Copy key has been pressed (S23). If a key has not been pressed, it decides whether the Help key has been pressed again (S24). If the Help key has been pressed again, the program returns to step S11 (in which case, the first CPU 16 may re-check whether the session is being terminated). If it is determined that the Print key was pressed in step S23, the contents of the display screen on the control panel 15 are printed (S25) and the program returns to step S21. If Dictionary Help was not selected in step S21, the first CPU 16 decides whether Operating Help was selected (S26). If it is determined that Operating Help was selected in step S26, the message "Press the key or area corresponding to the information you want" is displayed in the general selection key PP region shown in FIG. 2. When a particular area is pressed in response to the displayed message, an image and explanatory text on the operation of the pressed area are displayed (S27). The material displayed in this case, much as when Dictionary Help is selected, is the latest detailed information on Operating Help downloaded from the information source. After carrying out display in step S27, control by the first CPU 16 moves to step 23.

If Operating Help was not selected in step S26, the first CPU 16 decides whether Troubleshooting was selected (S28). If it is determined that Troubleshooting was selected, the message "Press the key or area corresponding to the information you want" is displayed in the general selection key PP region shown in FIG. 2. When a particular area corresponding to the displayed message is pressed, an image and explanatory text on troubleshooting for the pressed area are displayed (S29). The material displayed in this case, much as when Dictionary Help is selected, is the latest detailed information on Troubleshooting downloaded from the information source. After carrying out display in step S29, control by the first CPU 16 moves to step S23.

If the second CPU 26 determines in step S12 that the image-forming apparatus 100 is not connected to the network or determines in step S13 that access to the information source has already failed twice, the first CPU 16 displays a help list of simple solutions already stored within the first memory 14 (S31). In the present embodiment, the help list displayed has the same appearance as that displayed in step S16. In step S32, the same processing as that indicated above as step S20 is carried out for Dictionary Help, Operating Help, and Troubleshooting on the displayed help list, but the processing content which corresponds to steps S22, S27 and S29 is basically what has already been stored in the first memory 14, and is very simple (to save memory) compared with the processing content in steps S22, S27 and S29.

Next, an explanation is given, in conjunction with the flow diagram shown in FIG. 6, of a case in which some kind of malfunction occurs in the image-processing apparatus 100 shown in FIG. 1, giving rise to a situation that requires the attention of a service technician (referred to hereinafter as a "service call"). If the first CPU 16 determines that a service call situation has occurred because the apparatus 100 is in a given status (S41), it displays on the display screen of the control panel 15 a message such as "Press the Help Key" (S42) (preferably a flashing display accompanied by an audible indication) and decides whether the Help key Q1 has been pressed (S43). If the first CPU 16 determines that the Help key Q1 has not been pressed, it repeats the decision step. If it determines that the Help key Q1 has been pressed, it decides whether the image-processing apparatus 100 is connected to the network NW through the network interface 25 (S44). If the first CPU 16 determines that the image-processing apparatus 100 is connected to the network NW, it decides whether this is the first or second attempt or whether this is the third attempt at the same communication (S45). If the first CPU 16 determines that this is the first or second attempt at communication, it instructs the external interface 20 to initiate access to an information source (a device or service center on the network which is capable of furnishing information for the service call situation based on the help request) in order to request a response to the service call situation (S46).

The second CPU 26 decides whether access to the information source initiated in step S46 is successful (S47). If access is successful, information at the information source on the service call situation is retrieved and downloaded (S48), and the contents of that information are displayed on the display screen of the control panel 15 (S49). Moreover, in such a case, a message to this effect may be sent to the information source so as to enable a service technician at the information source where the message has been received to provide remedial instructions by voice or means to the user side equipment administrator, thus offering other options when the problem cannot be resolved using only the displayed information. It is also possible to make settings which enable the service technician in such a situation to communicate the projected date and time of his visit. If the second CPU 26 determines in step S43 that the image-forming apparatus 100 is not connected to the network NW, or determines in step S44 that communication is being attempted for the third time, simple solutions are displayed (S50). These simple solutions are ones that are already stored in the first memory 14 for service call situations. Settings typically will have been made so that information such as service center telephone numbers are displayed within the content of the simple solutions, in the event that the problem is not amenable to the simple solutions.

As shown in detail above, the foregoing arrangement of the invention enables someone on the user side to obtain help information after first checking what type of help information is available at the host computer. It enables the most up-to-date information concerning operating instructions and troubleshooting instructions to be furnished without requiring the apparatus for which help is being sought to have a large memory. Moreover, it has a service call function which can automatically notify the user of a malfunction requiring the attention of a service technician and provide information. Also, when a request for help information is being made, the desired information is easier to specify because selection can be carried out visually on a structural diagram.

Although an image-forming apparatus has been described herein as a preferred embodiment of the inventive apparatus having a help function, it is to be understood that the invention relates also to information-processing devices other than image-forming apparatuses. The help information-containing information source or host computer described in the preferred embodiments may be provided on-site through a local area network (LAN), or may be provided off-site through a public line such as the Internet or a telephone line. Requests for help information such as from an image-forming apparatus may be sent to a host computer or external service center through a server that handles such help information, and information such as help information from an information source or external service center may likewise be sent to the image-forming apparatus through a server

What is claimed is:

1. An apparatus having a help function, the apparatus being comprised of:

communication means for connecting via a communications line to an information source containing help information that includes at least operating instructions or troubleshooting instructions;

first help information selecting means for selecting desired help information from said information source connected via said communication means;

first help information displaying means for acquiring from said information source and displaying help information selected by said first help information selecting means;

memory means for storing help information;

means for deciding whether the apparatus is connected via a communications line to said information source and is ready to receive help information from said information source; and second help information displaying means for displaying help information stored in said memory means if said decision means determines that the apparatus is not in a ready-to-receive state.

2. The apparatus of claim 1, wherein said first help information selecting means has a means for displaying a first list of help information items available at said information source and for selecting desired items of help information from said list.

3. The apparatus of claim 2, wherein said first information list includes at least dictionary help information, operating help information, or troubleshooting information.

4. The apparatus of claim 1 wherein, if said decision means determines that the apparatus is not in a ready-to-receive state, said communication means initiates connection to said information source and attempts to set the apparatus in a ready-to-receive state.

5. The apparatus of claim 4 which has second help information selecting means for displaying a second information list of help information items stored in said help information memory means and for allowing desired help information to be selected from the list and displayed on said second help information displaying means.

6. The apparatus of claim 1 which has second help information selecting means for displaying a second information list of help information items stored in said help information memory means and for allowing desired help information to be selected from the list and displayed on said second help information displaying means.

7. The apparatus of claim 1 which additionally comprises section indicating means that allows an input to be made indicating the section of said apparatus for which specific help information is desired.

8. The apparatus of claim 7, wherein said section indicating means displays a structural diagram of the apparatus which is divided into a plurality of zones and allows the section in question to be selected.

9. The apparatus of claim 1 which is an image-forming apparatus.

10. An apparatus having a help function, the apparatus being comprised of:
   means for detecting a given status of the apparatus;
   means for connecting the apparatus, based on results of detection by said status detection means, to a specific information source via a communications line;
   help information displaying means for acquiring information on said given status from said specific information source and displaying it as help information; and
   connection request indicating means for indicating, based on the results of detection by said status detection means, a request to initiate connection by said connection means.

11. The apparatus of claim 10 wherein, based on the results of detection by said status detection means, said help information displaying means retrieves help information on said given status from said specific information source and displays the retrieved help information.

12. The apparatus of claim 10 which additionally comprises means for notifying a service center of a given status of said apparatus, based on the results of detection by said status detection means.

13. The apparatus of claim 10 which is an image-forming apparatus.

14. A method for displaying help information in an apparatus having a help function, the method comprising the steps of:
   connecting the apparatus via a communications line to an information source containing help information that includes at least operating instructions or troubleshooting instructions;
   selecting desired help information from said information source connected via said communications line;
   acquiring from said information source and displaying on a display help information selected in said help information selecting step; and
   displaying on the display secondary help information which is already stored in a memory provided in said apparatus if the connection to said information source is unsuccessful.

15. A method for displaying help information in an apparatus having a help function, the method comprising the steps of:
   detecting a given status of said apparatus;
   based on results of said given status detecting step, connecting the apparatus to a specific information source via a communications line;
   acquiring information on said given status from said specific information source and displaying it as help information; and
   displaying on the display secondary help information which is already stored in a memory provided in said apparatus if the connection to said information source is unsuccessful.

16. A method for displaying help information in an apparatus having a help function, the method comprising the steps of:
   based on a help request, attempting to access and connect to an information source containing as help information at least operating instructions or troubleshooting instructions;
   determining whether access is successful;
   if access is successful, displaying a list of help information on a display and allowing desired help information to be selected;
   acquiring from said information source help information relating to a selected item; and
   if access to said information source is unsuccessful, displaying on the display secondary help information which is already stored in a memory provided in said apparatus.

17. A program for displaying help information in an apparatus having a help function, which program executes on a computer the steps of:
   connecting the apparatus via a communications line to an information source containing help information that includes at least operating instructions or troubleshooting instructions;
   selecting desired help information from said information source connected via said communication line;
   acquiring help information selected in said help information selecting step from the information source and displaying it on a display; and
   displaying on the display secondary help information which is already stored in a memory provided in said apparatus if the connection to said information source is unsuccessful.

18. A program for displaying help information in an apparatus having a help function, which program executes the steps of:
   detecting a given status of said apparatus;
   based on results of said given status detecting step, connecting the apparatus to a specific information source via a communications line;
   acquiring information on said given status from said specific information source and displaying it as help information; and
   displaying on the display secondary help information which is already stored in a memory provided in said apparatus if the connection to said information source is unsuccessful.

19. An image-forming apparatus in which available explanatory material on operating instructions or troubleshooting instructions is pre-stored in a memory and which, when a help request asking for operating instructions or troubleshooting instructions is received, can respond to a user request by displaying said explanatory material on a control panel, the apparatus comprising:

an external interface which can be connected through a network to an information source containing operating instructions and troubleshooting instructions more detailed than the explanatory material stored in the memory so as to enable access to the information source; and a controller which, when a help request is received from a user, attempts to access said information source through said external interface and, if access is successful, displays a list of services available for the help request, then downloads from said information source and displays on the control panel explanatory material on whichever service is selected from among those displayed, but, if access to said information source is not successful, displays on the control panel the explanatory material already stored in the memory.

20. The image-forming apparatus of claim 19 wherein, when a malfunction requiring the attention of a service technician occurs during operation of the apparatus, said controller displays on the control panel a message prompting the user to issue a help request for a service call, and initiates access to said information source in response to the help request issued as a result of the displayed message.

21. The image-forming apparatus of claim 19 wherein, upon receiving a help request, said controller displays on the control panel a structural diagram of the apparatus divided into a plurality of zones for clear indication of the section of the apparatus to which the help request pertains, and allows that section to be selected.

22. An apparatus having a help function, the apparatus being comprised of:

communication means for connecting via a communications line to an information source containing help information that includes at least operating instructions or troubleshooting instructions;

first help information selecting means for selecting desired help information from said information source connected via said communication means;

first help information displaying means for acquiring from said information source and displaying help information selected by said first help information selecting means; and section indicating means that allows an input to be made indicating the section of said apparatus for which specific help information is desired, wherein said section indicating means displays a structural diagram of the apparatus which is divided into a plurality of zones and allows the section in question to be selected.

* * * * *